US011247285B1

(12) United States Patent
Collins et al.

(10) Patent No.: US 11,247,285 B1
(45) Date of Patent: Feb. 15, 2022

(54) FLUIDIZATION OF AGGLOMERATED SOLDER MICROSPHERES

(71) Applicant: Seagate Technology LLC, Cupertino, CA (US)

(72) Inventors: Aaron Collins, Minneapolis, MN (US); Joseph Nelson, Saint Paul, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 71 days.

(21) Appl. No.: 16/839,307

(22) Filed: Apr. 3, 2020

(51) Int. Cl.
*B23K 3/00* (2006.01)
*B23K 3/06* (2006.01)
*B05C 11/10* (2006.01)
*B65G 47/20* (2006.01)

(52) U.S. Cl.
CPC ........ *B23K 3/0623* (2013.01); *B05C 11/1034* (2013.01); *B65G 47/20* (2013.01)

(58) Field of Classification Search
CPC .............. B23K 3/0623; B23K 35/0244; B05C 11/1034; B65G 47/20
USPC ...... 228/245–246, 41, 180.22; 257/737–738; 438/613–616
See application file for complete search history.

(56) References Cited

U.S. PATENT DOCUMENTS

| | | | | |
|---|---|---|---|---|
| 4,871,110 A | * | 10/1989 | Fukasawa | ........... H01L 21/4853 228/245 |
| 5,653,381 A | | 8/1997 | Azdasht | |
| 5,655,704 A | * | 8/1997 | Sakemi | ................. B23K 3/0623 228/246 |
| 5,657,528 A | * | 8/1997 | Sakemi | ................. B23K 3/0623 228/245 |
| 5,687,901 A | * | 11/1997 | Hoshiba | .............. H01L 21/4853 228/246 |
| 5,918,792 A | * | 7/1999 | Stumpe | ................. H05K 3/3478 228/41 |
| 5,977,512 A | | 11/1999 | Azdasht et al. | |
| 6,119,919 A | | 9/2000 | Kasulke | |
| 6,152,348 A | | 11/2000 | Finn et al. | |
| 6,182,356 B1 | * | 2/2001 | Bolde | .................. B23K 3/0623 29/821 |
| 6,227,437 B1 | * | 5/2001 | Razon | .................. B23K 3/0623 228/254 |

(Continued)

FOREIGN PATENT DOCUMENTS

| | | | | |
|---|---|---|---|---|
| DE | 102007027291 A1 | * | 12/2008 | ........... B23K 3/0623 |
| DE | 102017110830 A1 | * | 11/2018 | ........... B23K 3/0623 |
| JP | 2002025025 A | * | 1/2002 | ........... B23K 3/0623 |

*Primary Examiner* — Kiley S Stoner
(74) *Attorney, Agent, or Firm* — Westman, Champlin & Koehler, P.A.

(57) ABSTRACT

An apparatus includes a hopper configured to receive a plurality of solder microspheres, and a moveable singulation device positioned proximate to and below the hopper. The moveable singulation device is configured to receive the plurality of solder microspheres from the hopper as the plurality of microspheres exit the hopper. The movable singulation device includes a plurality of holes, with each of the plurality of holes configured to receive a single solder microsphere of the plurality of solder micro spheres. The apparatus further includes a piezoelectric vibration device configured to provide ultrasonic vibrations to the singulation device, thereby preventing agglomeration of the plurality of solder microspheres in the hopper.

17 Claims, 5 Drawing Sheets

(56) References Cited

U.S. PATENT DOCUMENTS

| | | | |
|---|---|---|---|
| 6,253,992 B1* | 7/2001 | Fjelstad | B23K 3/0623 228/245 |
| 6,268,275 B1* | 7/2001 | Cobbley | H01L 21/6835 228/245 |
| 6,276,598 B1* | 8/2001 | Cheng | B23K 3/0623 228/245 |
| 6,336,581 B1* | 1/2002 | Tuchiya | B23K 3/0615 228/245 |
| 6,390,351 B1* | 5/2002 | Kasai | B23K 3/0623 228/41 |
| 6,604,673 B1* | 8/2003 | Bourrieres | B23K 3/0607 228/246 |
| 6,641,030 B1 | 11/2003 | Freeman et al. | |
| 6,889,886 B2 | 5/2005 | Hazeyama et al. | |
| 6,905,059 B2 | 6/2005 | Shafie | |
| 6,915,940 B2 | 7/2005 | Zakel et al. | |
| 6,957,760 B2 | 10/2005 | Cobbley et al. | |
| 7,021,517 B2 | 4/2006 | Zakel et al. | |
| 7,100,813 B2 | 9/2006 | Bayot | |
| 7,121,449 B2* | 10/2006 | Zakel | B23K 3/0607 228/102 |
| 7,348,515 B2 | 3/2008 | Wagou et al. | |
| 7,357,295 B2 | 4/2008 | Shindo et al. | |
| 7,591,406 B2 | 9/2009 | Wagoh et al. | |
| 7,829,817 B2 | 11/2010 | Zakel et al. | |
| 7,886,955 B2* | 2/2011 | Kitamura | B23K 1/203 228/41 |
| 8,001,683 B2 | 8/2011 | Kawamura et al. | |
| 8,328,068 B2 | 12/2012 | Azdasht et al. | |
| 8,434,664 B2 | 5/2013 | Aoya | |
| 9,144,818 B2 | 9/2015 | Doyle et al. | |
| 9,357,686 B2 | 5/2016 | Doyle et al. | |
| 10,804,239 B2* | 10/2020 | Ko | H01L 21/67288 |
| 2002/0053591 A1* | 5/2002 | Razon | B23K 3/0623 228/258 |
| 2002/0135064 A1* | 9/2002 | Hazeyama | H01L 24/11 257/737 |
| 2003/0127501 A1* | 7/2003 | Cheng | H01L 21/4853 228/246 |
| 2004/0149805 A1 | 8/2004 | Ito | |
| 2005/0045701 A1* | 3/2005 | Shindo | B23K 3/0623 228/246 |
| 2006/0169743 A1* | 8/2006 | Ng | H01L 24/11 228/39 |
| 2007/0090160 A1* | 4/2007 | Masumoto | B23K 35/365 228/101 |
| 2007/0130764 A1* | 6/2007 | Nebashi | H05K 3/3478 29/843 |
| 2008/0296355 A1* | 12/2008 | Costales | B23K 35/0244 228/246 |
| 2009/0001132 A1* | 1/2009 | Aoya | H01L 24/742 228/41 |
| 2009/0298278 A1* | 12/2009 | Tu | H05K 3/3478 438/616 |
| 2010/0148627 A1* | 6/2010 | Funasaka | G10K 9/122 310/316.01 |
| 2010/0213243 A1* | 8/2010 | Azdasht | B23K 1/06 228/18 |
| 2010/0272884 A1* | 10/2010 | Igarashi | H05K 3/3478 427/126.1 |
| 2011/0315747 A1* | 12/2011 | Yamamoto | H05K 3/3478 228/248.1 |
| 2013/0306709 A1* | 11/2013 | Oh | B23K 3/0623 228/41 |
| 2014/0224773 A1* | 8/2014 | Murata | B23K 3/0607 219/74 |
| 2015/0122873 A1* | 5/2015 | Lee | B23K 1/203 228/41 |
| 2016/0121416 A1* | 5/2016 | Murata | B23K 3/0623 228/248.1 |
| 2017/0203379 A1* | 7/2017 | Matsumoto | B23K 3/0623 |

\* cited by examiner

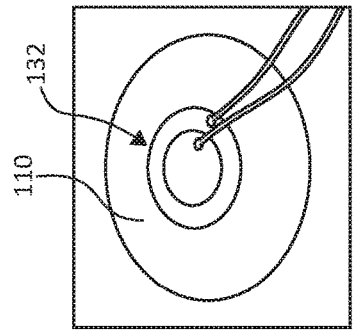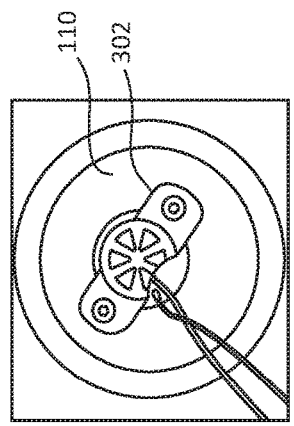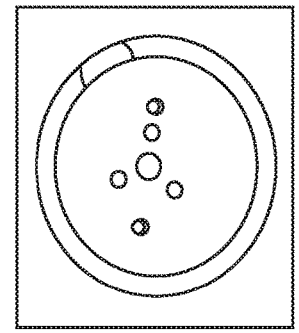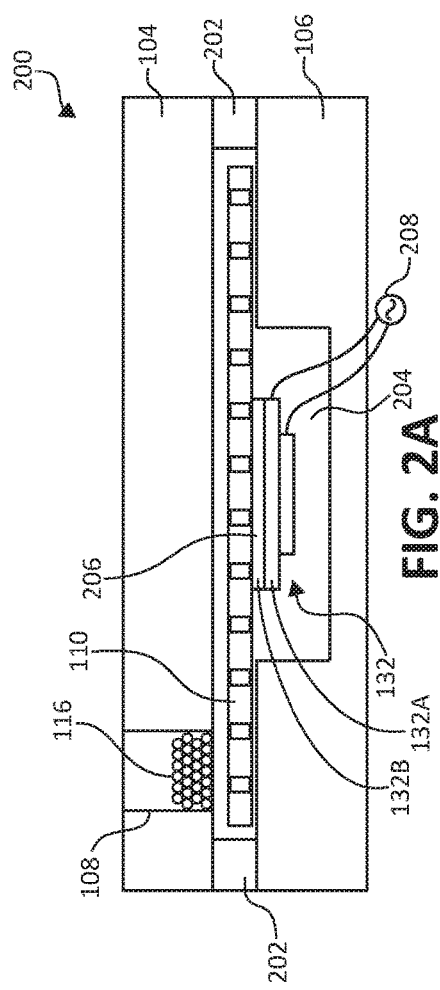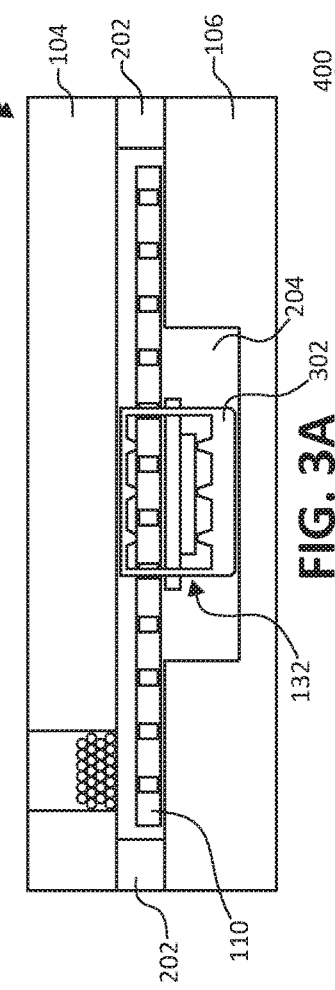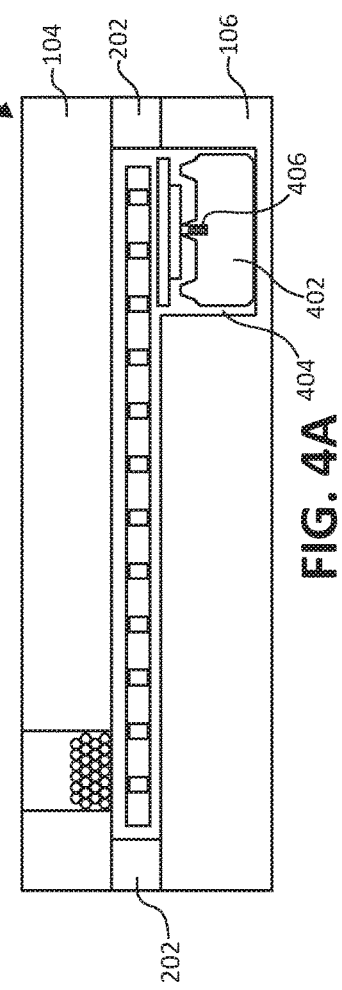

FLUIDIZATION OF AGGLOMERATED SOLDER MICROSPHERES

SUMMARY

In one embodiment, an apparatus is provided. The apparatus includes a hopper configured to receive a plurality of solder microspheres, and a moveable singulation device positioned proximate to and below the hopper. The moveable singulation device is configured to receive the plurality of solder microspheres from the hopper as the plurality of microspheres exit the hopper. The movable singulation device includes a plurality of holes, with each of the plurality of holes configured to receive a single solder microsphere of the plurality of solder microspheres. The apparatus further includes a piezoelectric vibration device configured to provide ultrasonic vibrations to the singulation device to prevent agglomeration of the plurality of solder microspheres in the hopper.

In another embodiment, a method is provided. The method includes receiving a plurality of solder microspheres in a hopper. The method also includes positioning a moveable singulation device proximate to and below the hopper. The moveable singulation device is capable of receiving the plurality of solder microspheres from the hopper as the plurality of microspheres exit the hopper. The moveable singulation device includes a plurality of holes, with each of the plurality of holes being capable of receiving a single solder microsphere of the plurality of solder microspheres. The method also includes providing, by a piezoelectric vibration device, ultrasonic vibrations to the moveable singulation device, and thereby preventing agglomeration of the plurality of solder microspheres in the hopper.

In yet another embodiment, a solder microsphere singulation apparatus is provided. The apparatus includes a moveable singulation device positioned proximate to and below a hopper. The moveable singulation device is configured to receive a plurality of solder microspheres from the hopper as the plurality of microspheres exit the hopper. The moveable singulation device includes a plurality of holes, with each of the plurality of holes configured to receive a single solder microsphere of the plurality of solder microspheres. The apparatus also includes a piezoelectric vibration device configured to provide ultrasonic vibrations to the moveable singulation device to prevent agglomeration of at least some of the plurality of solder microspheres in the hopper.

Other features and benefits that characterize embodiments of the disclosure will be apparent upon reading the following detailed description and review of the associated drawings.

BRIEF DESCRIPTION OF THE DRAWINGS

FIGS. 2A-5 and diagrammatic illustrations of different singulation system embodiments.

DETAILED DESCRIPTION OF ILLUSTRATIVE EMBODIMENTS

Figure 1A:
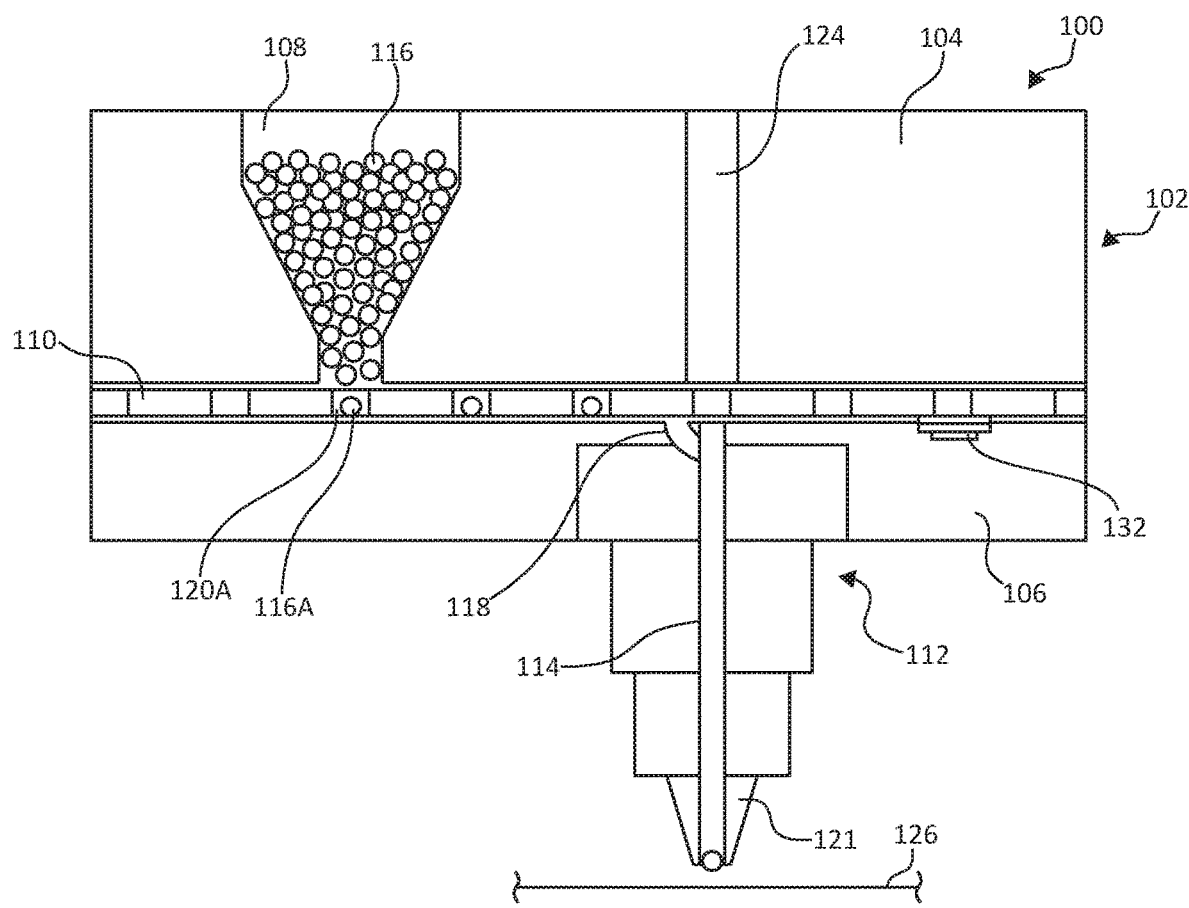
FIGS. 1A and 1B are diagrammatic illustrations of an example of a singulation system for solder microspheres in accordance with one embodiment.

Embodiments of the disclosure provide a technique for fluidizing solder microspheres that otherwise could agglomerate and prevent singulation in a moving floor singulation system.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1A is an example of a singulation system 100 for solder microspheres in accordance with one embodiment. Such a system may be utilized to, for example, form an interconnect between a slider and a trace gimbal assembly (TGA) for a hard disc drive. In general, the process involves singulation of a solder sphere into a capillary attached to a bondhead. The solder sphere is irradiated with a laser, melts, and is jetted from the capillary to form a thermal interconnect between the slider and the TGA.

As will be described below in connection with FIG. 1A, solder microspheres are singulated using a gravity-fed hopper over a "rotating floor" singulation disk. Solder microsphere diameters range between 60 micrometers (um) and 30 um, depending on a type of product being built. There is a strong negative correlation between solder sphere size and cohesion/adhesion between solder spheres resulting in aggregation (e.g., smaller sphere size leads to "stickier" solder). Sticky solder reduces singulation efficiency, and may result in damaged solder microspheres impacting downstream process and ultimately tool down-time. To address such problems, embodiments of the disclosure employ a piezoelectric vibration device to fluidize the solder micro spheres in the hopper. Prior to providing details regarding the placement and connection of the piezo piezoelectric vibration device, a description of the singulation system 100 of FIG. 1A is provided below.

Singulation system 100 includes a housing 102 having an upper bondhead 104 and a lower bondhead 106. A hopper 108 is included in the upper bondhead 104, and a "rotating floor" singulation device 110 is included between the upper bondhead 104 and a lower bondhead 106. System 100 also includes a solder application device 112 that includes an application capillary 114, which receives a solder microsphere 116 from the singulation device 110 via a feed capillary 118. The solder 116 exits the solder application device 112 at a lower end 121 of application capillary 114 where it is applied on a substrate 126 (e.g., a slider and a TGA). An upper end 122 of the application capillary 112 may be coupled to an optical fiber 124 that is connected to a laser device (not shown). Singulation system 100 also includes a mechanism for rotating the singulation device 110, which is not shown in the interest of simplification.

Figure 1B:
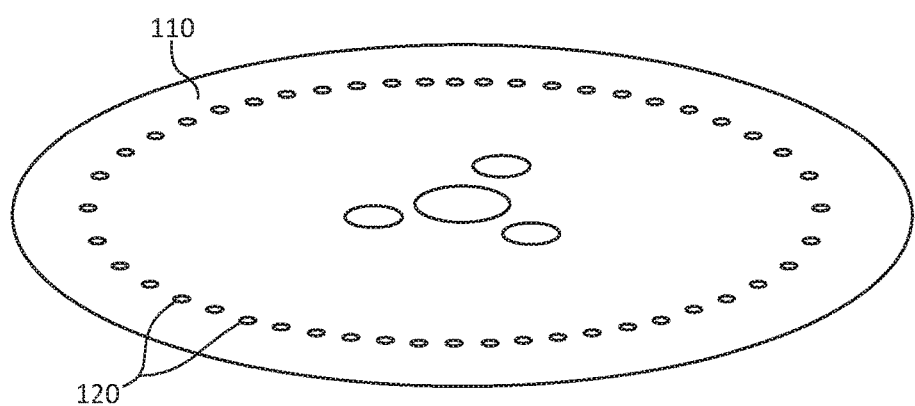

In one embodiment, singulation device 110 is a singulation disc of the type shown in FIG. 1B. As can be seen in FIG. 1B, singulation disc 110 includes a plurality of singulation holes 120 that are arranged in a ring and are each sized to receive a single solder microsphere of a plurality of solder microspheres 116 discharged from hopper 108. After the single solder microsphere (e.g., 116A is received into a particular one of the plurality of singulation holes 120 (e.g., 120A), the rotation of the singulation disc 110 causes the solder microsphere 116A to be positioned directly above feed capillary 118. In that position, the solder microsphere 116A is received into feed capillary 118 and transferred to application capillary 114 where it is applied on the substrate 126. In some embodiments, when the solder microsphere enters into the application capillary 114 and reaches the lower end 121 of the application capillary 114, the solder microsphere 116A is irradiated with the laser device (not shown) connected to the optical fiber 124. The resulting melted solder is jetted from the lower end 121 of the application capillary 114 onto the substrate 126.

Figure 1C:
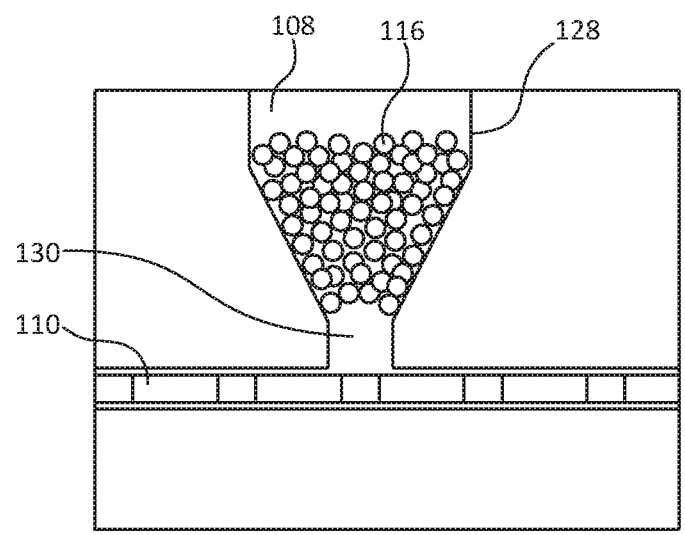
FIG. 1C is a diagrammatic illustration showing a bridging condition that may be caused in a hopper.

As noted above, reducing the solder sphere diameter size increases solder sphere agglomeration. FIG. 1C is a diagrammatic illustration showing a bridging condition that may be caused in hopper 108 due to agglomerated solder 116. Solder bridge 128 that is formed by solder microspheres 116 if they stick together may result in an empty area 130 above singulation disc 110. This prevents individual microspheres 116 from descending into singulation holes 120 in singulation disc 110.

To address the above-described bridging problem, embodiments of the disclosure employ a piezoelectric vibration device 132 that mechanically vibrates singulation disc 110 at ultrasonic frequencies driven by a suitable alternating current waveform (e.g., square, sinusoidal, trapezoidal, ramp, sawtooth, triangle, etc.). Vibration of the singulation disc 110 agitates and fluidizes solder microspheres 116, and prevents piling and bridging. Piezoelectric vibration device 132 may be attached to singulation disc 110 in any suitable manner and at any suitable location on the singulation disc 110. Examples of attachment locations and attachment mechanisms for coupling piezoelectric vibration device 132 to singulation disc 110 are provided below in connection FIGS. 2A-4B.

FIG. 2A is a side sectional view of a singulation system 200 for solder microspheres in accordance with one embodiment. FIG. 2B illustrates a bottom view of a singulation disc 110 of singulation system 200 showing a piezoelectric vibration device 132 connected to the singulation disc 110 in accordance with one embodiment. Singulation system 200 includes elements similar to those included in singulation system 100 of FIG. 1. Therefore, a description of the similar elements is not repeated. Also, capillary-related features shown in FIG. 1 are not shown in FIG. 2A in the interest of simplification. As can be seen in FIG. 2A, a spacer 202 provides separation between upper bondhead 104 and lower bondhead 106 to accommodate singulation disc 110, and lower bondhead 106 includes a cavity (e.g., a middle cavity) 204 that accommodates the piezoelectric vibration device 132. An adhesive layer 206 is included between singulation disc 110 and the piezoelectric vibration device 132. The adhesive layer 206 attaches the piezoelectric vibration device 132 to the singulation disc 110. A power supply 208, electrically coupled to the piezoelectric vibration device 132, is schematically shown in FIG. 2A. Power supply 208 provides ultrasonic frequency voltage waves to piezoelectric vibration device 132. In some embodiments, a frequency range of the ultrasonic frequency voltage waves provided by power supply 208 is between 20 Kilohertz (kHz) and 300 kHz. In certain embodiments, the power supply 208 provides a sweeping frequency (e.g., linearly varies frequencies of the ultrasonic frequency voltage waves in the 20-300 kHz frequency range). FIG. 2B shows the piezoelectric vibration device 132 attached to a middle of the singulation disc 110. However, in alternate embodiments, piezoelectric vibration device 132 may be attached by adhesive layer 206 at any other suitable location on the singulation disc 110. It should be noted that piezoelectric vibration device 132 may include multiple layers. For example, piezoelectric vibration device 132 may include a primary piezoelectric layer 132A bonded to an electrically conductive substrate 132B by an electrically conductive epoxy (not shown). In general, piezoelectric vibration device 132 may have any suitable configuration.

FIG. 3A is a side sectional view of a singulation system 300 for solder microspheres in accordance with one embodiment. FIG. 3B illustrates a bottom view of a singulation disc 110 of singulation system 300 showing a piezoelectric vibration device 132 connected to the singulation disc 110 in accordance with one embodiment. Singulation system 300 includes elements similar to those included in singulation systems 100 of FIG. 1 and 200 of FIG. 2. Therefore, a description of the similar elements is not repeated. As can be seen in FIGS. 3A and 3B, instead of using adhesive layer 206 (of FIGS. 2A and 2B) to attach piezoelectric vibration device 132 to singulation disc 110, a clamp 302 is used to provide the attachment. Clamp 302 may be made of any suitable material (e.g., a plastic). Portions of clamp 302 may be held in pace with suitable fasteners (e.g., screws that fit into holes in singulation disc 110).

FIG. 4A is a side sectional view of a singulation system 400 for solder microspheres in accordance with one embodiment. FIG. 4B illustrates a top view of a portion of singulation system 400 showing a piezoelectric vibration device 132 positioned below an outer edge of the singulation disc 110 in accordance with one embodiment. Singulation system 400 includes elements similar to those included in singulation systems 100 of FIG. 1, 200 of FIG. 2, and 300 of FIG. 3. Therefore, a description of the similar elements is not repeated. As can be seen in FIGS. 4A and 4B, instead of using adhesive layer 206 (of FIGS. 2A and 2B) or clamp 302 (of FIGS. 3A and 3B) to attach piezoelectric vibration device 132 to singulation disc 110, a base support 402 is included on which the piezoelectric vibration device 132 is supported in close proximity to, or in contact with, the singulation disc 110. In the embodiment of FIGS. 4A and 4B, the base support 402 is included in a cavity 404 in lower bondhead 106, which is offset from the middle of the singulation disc 110. However, in alternate embodiments, both the cavity 404 and the piezoelectric vibration device 132 may be in any other suitable location. In some embodiments, base support 202 may include one or more springs 406 to spring load piezoelectric vibration device 132 against singulation disc 110, such that piezoelectric vibration device 132 is in "light" contact with singulation disc 110. Such a configuration, in which the piezoelectric vibration device 132 lightly contacts singulation disc 110, enables ultrasonic vibrations to be provided to singulation disc 110 without inhibiting movement of the singulation disc 110.

Figure 5:
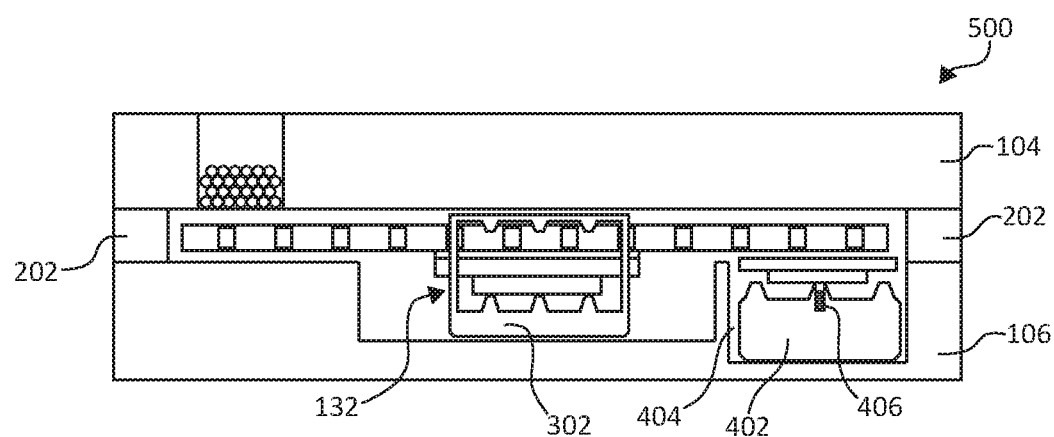

FIG. 5 is a side sectional view of a singulation system 500 for solder microspheres in accordance with one embodiment. The embodiment of FIG. 5 is included to show that any suitable combinations of the embodiments described above in connection with FIGS. 2A-4B may be employed. In the interest of brevity, individual elements of the embodiment of FIG. 5 are not described.

Figure 6:
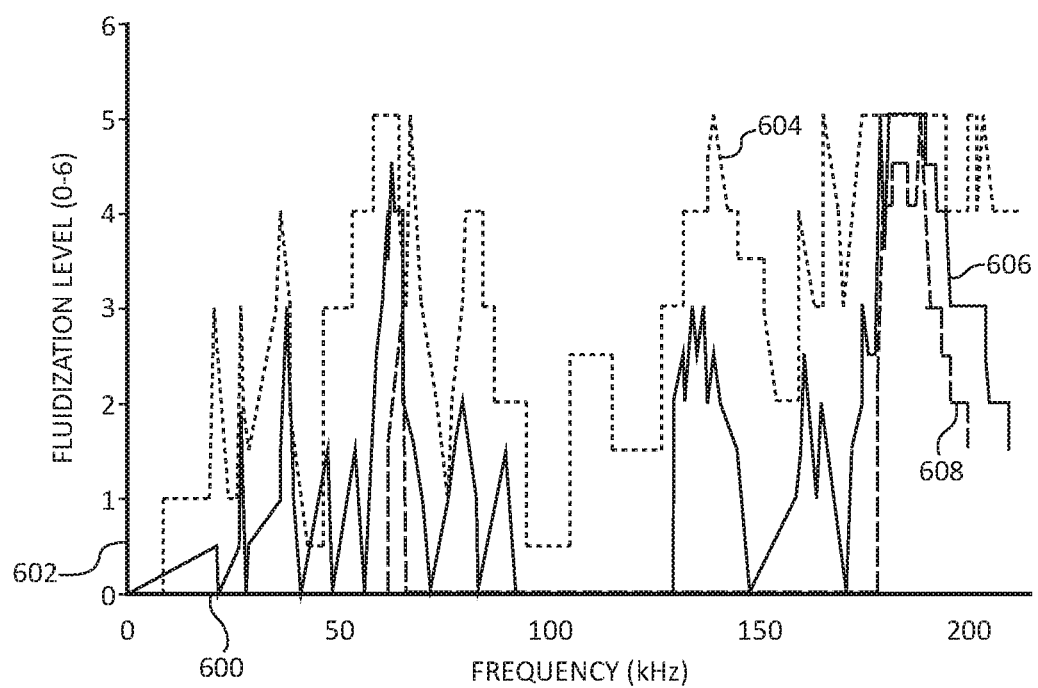
FIG. 6 is a graph illustrating a dependence of solder microsphere fluidization on frequencies of voltage signals used to drive a piezoelectric vibration device in embodiments such as those described in connection with FIGS. 1-5.
Figure 7:
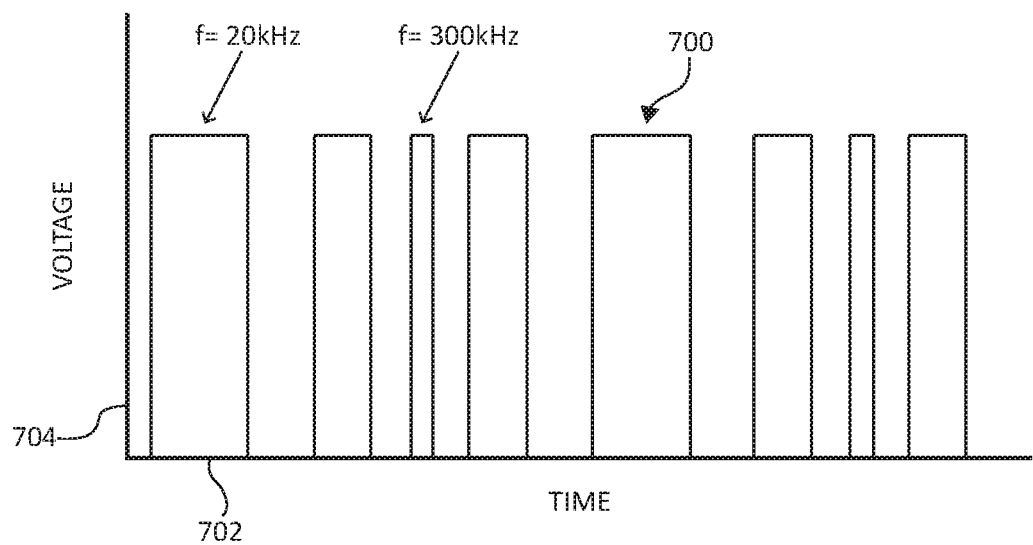
FIG. 7 is a graph of an example driving waveform in accordance with one embodiment.

FIG. 6 is a graph illustrating a dependence of solder microsphere fluidization on frequencies of voltage signals used to drive the piezoelectric vibration device 132 in embodiments such as those described above in connection with FIGS. 1-5. In FIG. 6, horizontal axis 600 represents frequency in kHz and vertical axis 602 represents a solder microsphere fluidization level. Plots 604, 606 and 608 represent results obtained for approximately 80,000, approximately 150,000 and approximately 250,000 solder microspheres, respectively. From FIG. 6, it is seen that fluidization is most effective when the piezoelectric vibration device is driven with ultrasonic frequency square waves in a range of about 50 kHz to about 200 kHz. Sweeping the frequency in the range of about 20 kHz to about 300 kHz may help ensure periodic and frequent fluidization/de-piling of the solder microspheres. An example of such a driving waveform is shown in FIG. 7 in which the driving waveform is denoted by reference numeral 700, and the horizontal axis (time) and vertical axis (frequency) are denoted by reference numerals 702 and 704, respectively.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
   a hopper configured to receive a plurality of solder microspheres;
   a moveable singulation device positioned proximate to and below the hopper, the moveable singulation device configured to receive the plurality of solder microspheres from the hopper as the plurality of microspheres exit the hopper, and the moveable singulation device comprising a plurality of holes, with each of the plurality of holes configured to receive a single solder microsphere of the plurality of solder microspheres; and
   a piezoelectric vibration device configured to provide ultrasonic vibrations to the moveable singulation device to prevent agglomeration of the plurality of solder microspheres in the hopper,
   wherein the moveable singulation device comprises a singulation disc including the plurality of holes, the singulation disc configured to be rotated about an axis and to thereby enable transferring of the received single solder microsphere in a particular hole of the plurality of holes to a capillary positioned below the singulation disc when the particular hole is positioned over the capillary.

2. The apparatus of claim 1 and further comprising a clamp configured to attach the piezoelectric vibration device to the singulation disc.

3. The apparatus of claim 1 and further comprising an adhesive layer between the singulation disc and the piezoelectric vibration device, the adhesive layer attaching the piezoelectric vibration device to the singulation disc.

4. The apparatus of claim 1 and further comprising a base support on which the piezoelectric vibration device is supported in close proximity to, or in contact with, the singulation disc.

5. The apparatus of claim 1 and further comprising a power supply electrically coupled to the piezoelectric vibration device.

6. The apparatus of claim 5 and wherein the power supply is configured to provide ultrasonic frequency voltage waves.

7. The apparatus of claim 6 and wherein a frequency range of the ultrasonic frequency voltage waves is between 20 Kilohertz (kHz) and 300 kHz, and wherein the power supply is configured linearly vary frequencies of the ultrasonic frequency voltage waves in the 50-200 kHz frequency range.

8. A method comprising:
receiving a plurality of solder microspheres in a hopper;
positioning a moveable singulation device proximate to and below the hopper, the moveable singulation device capable of receiving the plurality of solder microspheres from the hopper as the plurality of microspheres exit the hopper, and the moveable singulation device having a plurality of holes, with each of the plurality of holes being capable of receiving a single solder microsphere of the plurality of solder microspheres; and
providing, by a piezoelectric vibration device, ultrasonic vibrations to the moveable singulation device, and thereby preventing agglomeration of the plurality of solder microspheres in the hopper,
wherein positioning the moveable singulation device proximate to and below the hopper comprises positioning a singulation disc including the plurality of holes proximate to and below the hopper, the singulation disc being rotatable about an axis to transfer the received single solder microsphere in a particular hole of the plurality of holes to a capillary positioned below the singulation disc when the particular hole is positioned over the capillary.

9. The method of claim 8 and further comprising attaching the piezoelectric vibration device to the singulation disc by a clamp.

10. The method of claim 8 and further comprising attaching the piezoelectric vibration device to the singulation disc by an adhesive layer.

11. The method of claim 8 and further supporting the piezoelectric vibration device is close proximity to, or in contact with, the singulation disc by a base support.

12. The method of claim 8 and further comprising providing ultrasonic frequency voltage waves to the piezoelectric vibration device.

13. The method of claim 12 and wherein a frequency range of the ultrasonic frequency voltage waves is between 20 Kilohertz (kHz) and 300 kHz, and wherein frequencies of the ultrasonic frequency voltage waves are varied linearly in the 20-300 kHz frequency range.

14. A solder microsphere singulation apparatus comprising:
a moveable singulation device positioned proximate to and below a hopper, the moveable singulation device configured to receive a plurality of solder microspheres from the hopper as the plurality of microspheres exit the hopper, and the moveable singulation device comprising a plurality of holes, with each of the plurality of holes configured to receive a single solder micro sphere of the plurality of solder microspheres; and
a piezoelectric vibration device configured to provide ultrasonic vibrations to the moveable singulation device to prevent agglomeration of at least some of the plurality of solder microspheres in the hopper,
wherein the moveable singulation device comprises a singulation disc including the plurality of holes, the singulation disc configured to be rotated about an axis and to thereby enable transferring of the received single solder microsphere in a particular hole of the plurality of holes to a capillary positioned below the singulation disc when the particular hole is positioned over the capillary.

15. The apparatus of claim 14 and further comprising a clamp configured to attach the piezoelectric vibration device to the singulation disc.

16. The apparatus of claim 14 and further comprising an adhesive layer between the singulation disc and the piezoelectric vibration device, the adhesive layer attaching the piezoelectric vibration device to the singulation disc.

17. The apparatus of claim 14 and further comprising a base support on which the piezoelectric vibration device is supported in close proximity to, or in contact with, the singulation disc.

* * * * *